United States Patent Office 3,296,255
Patented Jan. 3, 1967

3,296,255
2-CYANO STEROIDS
Raymond O. Clinton, East Greenbush, and Andrew John Manson, North Greenbush, N.Y., assignors to Sterling Drug Inc., New York, N.Y., a corporation of Delaware
No Drawing. Filed Nov. 29, 1963, Ser. No. 327,070
22 Claims. (Cl. 260—239.55)

This application is a continuation-in-part of our copending application Serial No. 39,458, filed June 29, 1960, now U.S. Patent 3,135,743, which is in turn a continuation-in-part of our application Serial No. 750,289, filed June 23, 1958, now abandoned.

This invention relates to cyano substituted steroids, and in particular it is concerned with 2-cyano-steroids and the preparation thereof.

The present invention is concerned with 2-cyano-3-oxosteroids, the steroid moiety having seventeen to about twenty-three carbon atoms exclusive of ester radicals.

The ring structure of the compounds of the invention is represented by the following structure:

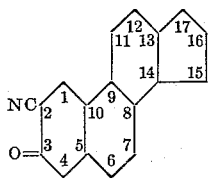

The exact nature of the steroid moiety is not critical, and it can be derived from any steroid of the general type known to exhibit hormonal or other pharmacological or endocrinological properties. Such steroid moieties have from seventeen to about twenty-three carbon atoms, not counting carbon content which may be provided by esterified hydroxy groups. Esterified hydroxysteroids are included within the scope of the invention, but the carbon content contributed by the acid moiety of the ester is not considered part of the essential carbon content of the steroid.

The steroid moiety can be any member of the estrane, 18-norestrane, androstane, etiocholane, pregnane or allopregnane series. The foregoing can contain varying degrees of unsaturation and a variety of substituents in the form of hydrocarbon radicals or functional groups conventionally employed in the steroid art. Representative of the steroid moieties which make up the compounds of the invention are those having at position 17 a hydroxy, acyloxy, oxo, or both a hydroxy and a lower-alkyl radical, characteristic of the androgenic and anabolic steroids; or a lower-alkenyl, lower-alkynyl, acetyl, hydroxyacetal, 1,2-dihydroxyetheyl, 1-hydroxyethyl, and the like radicals, characteristic of the progestational and adrenal cortical steroids. The steroid moiety can also have one or more substitutents at other positions of the nucleus, for example, hydroxy, acyloxy, or oxo radicals at positions 4, 6, 7, 11, 12, 14 or 16; epoxy groups at adjacent positions, for example at the 5,6-, 9,11-, 11,12- or 15,16-positions; halogen atoms, preferably fluorine, chlorine or bromine, for example, at the 4-, 6-, 7-, 9-, 12-, 16-, 17- or 21-positions; and lower-alkyl groups, for example, at the 4-, 5-, 6-, 7-, 11- or 16-positions. The steroid moiety can also have one or more double bonds, especially at the 4,5-, 5,6-, or 6,7-positions. The steroid moiety usually possesses angular methyl groups at $C_{10}$ and $C_{13}$, although 18- and 19-norsteroids and 18,19-bisnorsteroids, lacking one or both of the angular methyl groups at $C_{13}$ and $C_{10}$, respectively, are also representative steroids.

The 18,19-bisnorsteroid, 18,19-norsteroid and normal steroid moieties in the compounds of the invention contain, respectively, seventeen, eighteen and nineteen carbon atoms plus any carbon content which may be provided by one or more nuclearly substituted carbon containing radicals, up to and including a total of about twenty-three carbon atoms, exclusive of ester radicals.

When ester linkages are present in the steroid molecule, the acyl radicals are preferably derived from carboxylic acids having from one to about ten carbon atoms, conventionally employed in the steroid art, and having a molecular weight less than about 200. Representative of the acyl radicals which can be present are lower-alkanoyl radicals, e.g., formyl, acetyl, propionyl, butyryl, isobutyryl, caproyl, heptanoyl, octanoyl, trimethylacetyl, and the like; carboxy-lower-alkanoyl radicals, e.g., succinyl (β-carboxypropionyl); cycloalkyl-lower-alkanoyl radicals, e.g., β-cyclopentylpropionyl, β-cyclohexylpropionyl, and the like; monocarbocyclic aroyl radicals, e.g., benzoyl, p-toluyl, p-nitrobenzoyl, 3,4,5-trimethoxybenzoyl, and the like; monocarbocyclic aryl-lower-alkanoyl or -alkenoyl radicals, such as phenylacetyl, β-phenylpropionyl, cinnamoyl, and the like; and monocarbocyclic aryloxy-lower-alkanoyl radicals, such as p-chlorophenoxyacetyl, and the like. Esters of inorganic acids such as phosphoric acid are also contemplated. When monocarbocyclic aryl groups are present in the ester moieties, monocarbocyclic aryl includes phenyl and phenyl substituted by from one to three lower-alkyl, lower-alkoxy, halogen or nitro groups.

The esters are prepared by conventional procedures as by treating the corresponding steroid alcohol with the appropriate acid halide or anhydride. Also included are enol esters involving the 3-oxo group having the partial formula:

wherein Ac represents an acyl radical of the type described hereinabove. The enol esters are prepared by heating the 2-cyano-3-oxo compounds with the appropriate acid anhydride in the presence of pyridine.

The 2α-cyano-3-oxo steroids of the invention are prepared by cleaving a steroido[2,3-d]isoxazole with a strong base according to the following scheme

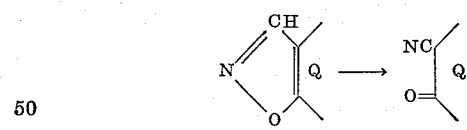

wherein Q represents the remainder of the steroid moiety. The 2-cyano group assumes the α-configuration in steroids of the androstane series (Rings A/B trans) and in Δ⁴- and Δ⁵-steroids, whereas it assumes the β-configuration in steroids of the etiocholane series (Rings A/B cis).

Any strong base can be used for the conversion of the isoxazole to the cyano ketone; however, alkali metal alkoxides are preferred and the reaction is best carried out in an anhydrous medium.

The 2-cyano-3-oxo steroids are acidic in nature, having an active hydrogen atom in the 2-position, and therefore form salts with strong bases such as alkali metal hydroxides or alkoxides. Thus, in the clevage of the isoxazole a salt of the 2-cyano-3-oxo steroid is initially produced, and said salt is converted to the free 2-cyano-3-oxo steroid by acidification. For the purposes of the present invention the salts are the full equivalents of the free acids (free 2-cyano-3-oxo steroids).

The intermediate steroido[2,3-d]isoxazoles are prepared by reacting a 2-(1-hydroxyalkylidene)-3-oxo-steroid with hydroxylamine or an acid-addition salt thereof according to the following equation:

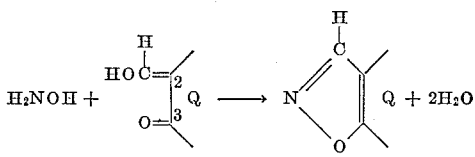

The intermediate isoxazoles and their preparation are disclosed and claimed in our copending application Serial No. 39,458, filed June 29, 1960, now U.S. Patent 3,135,-743, of which the present application is a continuation-in-part.

The 2-cyano-3-oxo steroids have been found to possess endocrinological and pharmacological activity, for example, adrenal inhibiting, pituitary inhibiting, electrolyte modifying, hypotensive and coronary dilator properties. A particularly preferred class of 2-cyano-3-oxo steroids possessing adrenal inhibiting properties are those having two lower-alkyl radicals in the 4-position and a double bond in the 5,6-position of the steroid nucleus, and represented by the partial formula:

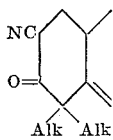

A preferred aspect of the invention is thus concerned with 2α-cyano-3-oxo steroids, the steroid moiety having from seventeen to about twenty-three carbon atoms exclusive of ester radicals, and in addition having two lower-alkyl radicals in the 4-position and a double bond in the 5,6-position. The lower-alkyl radicals preferably have from one to four carbon atoms.

The compounds of the invention can be prepared for use by dispersing them in an aqueous suspension or by dissolving them in a pharmacologically acceptable oil or oil-water emulsion for parenteral administration; or by incorporation in tablet form with excipients for oral administration.

The structures of the compounds of the invention were established by the mode of preparation, by elementary analysis and by ultraviolet and infrared spectral data.

The following examples will further illustrate the invention without the latter being limited thereby.

EXAMPLE 1

(a) *2-hydroxymethylene-17α-methyl-4-androsten-17β-ol-3-one*

To a dry 2 liter, 3-necked flask, fitted with a stopper, gas outlet stopcock and a condenser arranged for distillation into a receiver equipped with a calcium chloride tube, was added a solution of 50.0 g. (0.165 mole) of 17α-methyl-4-androsten-17β-ol-3-one in 1200 ml. of benzene. A portion of the benzene (200 ml.) was removed by distillation to insure anhydrous conditions. The distillation apparatus was replaced with an outlet tube connected to a gas trap which consisted of a U-tube filled with an amount of mercury that would allow the escape of any positive pressure built up in the reaction flask. A slow stream of nitrogen was introduced into the reaction flask through the gas outlet stopcock. Sodium hydride (10.0 g., 0.42 mole) and 35 ml. (0.43 mole) of ethyl formate, previously dried over phosphorus pentoxide and distilled, were added. The reaction mixture was allowed to stand at room temperature under a nitrogen atmosphere for five days, after which time an orange gel had formed and no further evolution of gas could be observed. The reaction flask was fitted with a mechanical stirrer, and 25 ml. of methyl alcohol was carefully added with stirring to decompose excess soduim hydride. The reaction mixture was poured into 1500 ml. of water and shaken. The layers were separated, and the aqueous layer was extracted with ether, cooled to ice bath temperature and acidified with concentrated hydrochloric acid containing ice. The solid product was collected by filtration, washed with water and dried at 60° C. for twenty-four hours in vacuo, giving 49.1 g. of 2-hydroxymethylene-17α-methyl-4-androsten-17β-ol-3-one. A sample when recrystallized from a methanol-water mixture had the M.P. 178.5–180° C. (corr.), $[\alpha]_D^{23} = +14.0°$ (1% in chloroform); ultraviolet maxima at 252 and 307 mμ ($\epsilon=12,000$ and 6,030).

(b) *17β-hydroxy-17α-methyl-4-androsteno [2,3-d]isoxazole*

To a 500 ml., 3-necked flask, equipped with a sealed Hershberg-type stirrer, a reflux condenser and a stopper, was added a solution of 20.0 g. (0.0605 mole) of 2-hydroxymethylene-17α - methyl-4-androsten-17β-ol-3-one in 300 ml. of 95% ethanol. Stirring was commenced and a slurry of 4.80 g. (0.0585 mole) of fused sodium acetate and 4.42 g. (0.0635 mole) of hydroxylamine hydrochloride in 100 ml. of glacial acetic acid was added. The mixture was refluxed gently on a steam bath for one and one-half hours. Fifteen minutes after initiating the reaction, the reaction mixture gave a negative ferric chloride test. Most of the ethanol and acetic acid were removed by distillation in vacuo, 300 ml. of water and 300 ml. of ether were added to the concentrate, and the mixture was shaken. The layers were separated, the aqueous layer extracted with fresh ether, and the combined ether extracts were washed with water, dried over anhydrous soduim sulfate, filtered and evaporated to dryness in vacuo. The residue was crystallized by trituration with ether, and the crystals were collected by filtration, washed with hexane and dried, giving 12.0 g., M.P. 164–175° C. (uncorr.). The mother liquors were concentrated to dryness and dissolved in a minimum amount of acetone, whereupon a second crop was obtained, 2.5 g., M.P. 164–175° C. (uncorr.). The two crops were combined, dissolved in ethyl acetate, decolorized with activated charcoal, and recovered by concentration, yielding 11.8 g. of 17β-hydroxy-17α - methyl - 4 - androsteno[2,3-d]isoxazole, M.P. 177.0–179.6° C. (corr.) after a second recrystallization from acetone; $[\alpha]_D^{25} = +108.8 \pm 0.3°$ (1% in chloroform); ultraviolet maximum at 285 mμ ($\epsilon=11,900$).

(c) *2α-cyano-17α-methyl-4-androsten-17β-ol-3-one*

A solution of 5.00 g. of 17β-hydroxy-17α-methyl-4-androsteno[2,3-d]isoxazole in 500 ml. of absolute ether was added to a solution of sodium methoxide prepared from 0.5 g. of sodium and 5 ml. of absolute methanol. The mixture was shaken for one hour, poured into water and 100 ml. of 5% sodium hydroxide was added. The latter mixture was shaken, and the ether layer was separated, washed three times with 5% sodium hydroxide solution and once with water. The combined aqueous layers and undissolved material was cooled to 10° C. and acidified with concentrated hydrochloric acid containing ice. The acidified mixture was extracted twice with ethyl acetate, and the extracts were dried over anhydrous sodium sulfate, saturated with nitrogen and concentrated in vacuo using a stream of nitrogen. The residue was recrystallized twice from an ether-hexane mixture and dried at 95° C. in vacuo for eight hours to give 2α-cyano-17α-methyl-4-androsten-17β-ol-3-one, M.P. 167.2–171.0° C. (corr.), $[\alpha]_D^{25} = +93.0 \pm 0.1°$ (1% in chloroform); ultraviolet maxima at 243 and 310 mμ ($\epsilon=14,600$ and 465).

The 3-ethylene glycol ketal of 2α-cyano-17α-methyl-4-androsten-17β-ol-3-one was obtained by heating a mixture of 1.00 g. of 2α-cyano-17α-methyl-4-androsten-17β-ol-3-one, 10 ml. of ethylene glycol, 50 mg. of sulfosalicylic acid and 125 ml. of benzene at reflux for 165 minutes under a water separator. The ketal was obtained in the form of colorless needles, M.P. 179.2–181.0° C.

(corr.) when recrystallized from ether and from ethyl acetate, $[\alpha]_D^{25}=+72.1°$ (1% in chloroform).

EXAMPLE 2

17β-hydroxy - 17α - methylandrostano[2,3-d]isoxazole was treated with sodium methoxide according to the procedure of Example 1, part (c) to give 2α-cyano-17α-methylandrostan - 17β - ol - 3-one, M.P. 252.4–257.8° C. (corr.), $[\alpha]_D^{25}=+50.7°$ (0.5% in pyridine).

EXAMPLE 3

17β-hydroxy - 17α - methyletiocholano[2,3-d]isoxazole was treated with sodium methoxide according to the procedure of Example 1, part (c) to give 2β-cyano-17α-methyletiocholan - 17β - ol-3-one, M.P. 222.4–226.0° C. (corr.), $[\alpha]_D^{25}=-30.8°$ (1% in ethanol).

EXAMPLE 4

17β - hydroxyandrostano[2,3 - d]isoxazole was treated with sodium methoxide according to the procedure of Example 1, part (c) to give 2α-cyanoandrostan-17β-ol-3-one, M.P. 250.0–252.0° C. (corr.).

EXAMPLE 5

*2α-cyano-4,4,17α-trimethyl-5-androsten-17β-ol-3-one*

A 250 ml. Erlenmeyer flask, equipped with a calcium chloride tube and a magnetic stirrer bar, was charged with a solution of 11.7 g. (0.0330 mole) of 17β-hydroxy-4,4,17α-trimethyl-5-androsteno[2,3-d]isoxazole in 50 ml. of tetrahydrofuran. The solution was stirred and 3.6 g. (0.0667 mole) of sodium methoxide was added. The solution became clear but after several minutes the sodium salt of the product began to precipitate. An additional 20 ml. of tetrahydrofuran was added and stirring was continued for one hour. Ether (200 ml.) was added to the mixture which was then extracted with 250 ml. and 100 ml. portions of water. The aqueous layers were acidified with a slight excess of hydrochloric acid at room temperature. The resulting solid product was collected by filtration and dried at 60° C. to give 11.5 g. of 2α-cyano-4,4,17α - trimethyl-5-androsten-17β-ol-3-one, M.P. 225–230° C. (uncorr.). The compound was further purified as follows: 187 g. of product was dissolved in 1 liter of hot tetrahydrofuran, the solution was filtered, and 1 liter of hot ethyl acetate was slowly added to the filtrate. The solution as concentrated to a volume of 1200 ml. and allowed to cool in a refrigerator for about seventeen hours. The product which had separated was collected by filtration and the mother liquors were concentrated to a volume of 400 ml., cooled, and a second crop collected. There was thus obtained 119 g., M.P. 222.8–228.2° C. (corr.), $[\alpha]_D^{25}=-34.9°$ (1% in chloroform), ultraviolet maximum at 238 mμ (ε=7,600); and 44 g., M.P. 221.8–224.2° C. (corr.), $[\alpha]_D^{25}=-35.5°$, ultraviolet maximum at 238 mμ (ε=7,300).

2α-cyano-4,4,17α-trimethyl-5-androsten - 17β - ol-3-one showed no marked effects in normal animals but was very effective in reversing effects due to ACTH-induced adrenal cortical hyperfunction. Laboratory studies in rats showed that this compound interferes with the synthesis of corticosterone, and these results indicate the compound to have a beneficial action in pathological conditions brought about by over-activity of the adrenal glands. 2α-cyano - 4,4,17α - trimethyl-5-androsten-17β-ol-3-one also lowered blood pressure (by 20–28 mm. Hg) of renal hypertensive rates when given in single oral doses of 2.5 to 10 mg./kg. Daily subcutaneous injection of the compound (5 mg./kg./day) for four days resulted in sustained hypotensive action (10–40 mm. Hg). 2α-cyano - 4,4,17α - trimethyl-5-androsten-17β-ol-3-one has a very low toxicity. No $LD_{50}$ could be determined since doses up to 8000 mg./kg. have been tolerated. In a five day monkey study no adverse effects were observed at a 100 mg./kg. dose.

EXAMPLE 6

*2-cyano-3-(β-cyclohexylpropionoxy)-4,4,17α-trimethyl-2,5-androstadien-17β-ol*

(β-cyclohexylpropionate enol ester of 2α-cyano-4,4,17α-trimethyl-5-androsten-17β-ol-3-one.)

A mixture of 8.6 g. (0.0242 mole) of 2α-cyano-4,4,17α-trimethyl-5-androsten-17β-ol-3-one, 21.4 g. (0.0726 mole) of β-cyclohexylpropionic anhydride and 50 ml. of pyridine was refluxed for three hours. The reaction mixture was poured into ice water, allowed to stand for about seventeen hours and then extracted with ether. The ether extracts were washed with 5% sodium carbonate solution, dried over anhydrous sodium sulfate and concentrated in vacuo. The residue was chromatographed on neutral alumina using pentane as a solvent. The column was eluted with pentane containing gradually increasing amounts of ether, and then with ether alone. The crystalline product thus obtained was recrystallized from an ether-pentane mixture to give 4.2 g. of 2-cyano-3-(β - cyclohexylpropionoxy) - 4,4,17α - trimethyl-2,5-androstadien-17β-ol, M.P. 104–110° C. (uncorr.). A sample of the compound when again recrystallized had the M.P. 106.2–109.4° C. (corr.), $$[\alpha]_D^{25}=-49.8°$$

(1% in chloroform), ultraviolet maximum at 219 mμ (ε=9,940), infrared maxima at 2.88, 3.43, 4.50, 5.65, 6.01 and 6.89 μ, indicating the presence of a hydroxy group and the absence of a carbonyl group.

2-cyano - 3 - (β - cyclohexylpropionoxy)-4,4,17α-trimethyl-2,5-androstadien-17β-ol was found to have a pharmacological activity similar to that of 2α-cyano-4,4,17α-trimethyl-5-androsten-17β-ol-3-one.

EXAMPLE 7

(a) 17β - hydroxy - 4,4 - dimethylandrostano[2,3 - d]isoxazole was prepared from hydroxylamine and 2-hydroxymethylene - 4,4 - dimethylandrostan - 17β - ol-3-one (M.P. 155–160° C., from 4,4-dimethylandrostan-17β-ol-3-one and ethyl formate in the presence of sodium methoxide in pyridine), and it had the M.P. 222.0–227.9° C. (corr.) when recrystallized from isopropyl alcohol, $[\alpha]_D=+32.6°$ (1% in chloroform).

(b) 2α-cyano-4,4-dimethylandrostan-17β-ol-3-one was prepared by treating 17β-hydroxy-4,4-dimethylandrostano[2,3-d]isoxazole with sodium methoxide, and had the M.P. 263.1–272.7° C. (corr.) when recrystallized from isopropyl alcohol, $[\alpha]_D=+37.7°$ (1% in pyridine).

EXAMPLE 8

(a) 17β-hydroxy-4,4-dimethyl - 5 - androsteno[2,4-d]isoxazole was prepared from hydroxylamine and 2-hydroxymethylene-4,4-dimethyl-4-androsten - 17β - ol-3-one (M.P. 148–154° C., from 4,4-dimethyl - 4 - androsten-17β-ol-3-one and ethyl formate in the presence of sodium methoxide in pyridine), and it had the M.P. 192.6–195.4° C. (corr.) when recrystallized from an ether-pentane mixture, $[\alpha]_D=-39.6°$ (1% in chloroform).

(b) 2α-cyano - 4-4 - dimethyl-5-androsten-17β-ol-3-one was prepared by treating 17β-hydroxy - 4,4 - dimethyl-5-androsteno[2,3-d]isoxazole with sodium methoxide, and had the M.P. 215.0–218.2° C. (corr.) when recrystallized from isopropyl alcohol, $[\alpha]_D=-23.5°$ (1% in pyridine).

2α-cyano-4,4-dimethyl - 5 - androsten - 17β - ol-3-one was found to have a pharmacological activity similar to that of 2α-cyano-4,4,17α-trimethyl - 5 - androsten-17β-ol-3-one.

2α-cyano-4,4-dimethyl - 5 - androsten - 17β - ol-3-one can be caused to react with acetic anhydride, propionic anhydride, caproyl chloride, succinic anhydride, β-cyclopentylpropionyl chloride, benzoyl chloride, p-nitrobenzoyl chloride, 3,4,5-trimethoxybenzoyl chloride, phenylacetyl chloride, or cinnamoyl chloride, by heating in the presence of pyridine, to give, respectively, 2α-cyano-3,17β-diacetoxy-4,4-dimethyl-2,5-androstadiene, 2α-cyano-3,17β-dipropionoxy-4,4-dimethyl-2,5-androstadiene, 2α-cyano-3,17β-dicaproyloxy-4,4-dimethyl-2,5-androstadiene, 2α-cyano-3,17β-di(β-carboxypropionoxy)-4,4-dimethyl-2,5-androstadiene, 2α-cyano-3,17β-di(β-cyclopentylpropionoxy)-4,4-dimethyl-2,5-androstadiene, 2α-cyano-3,17β-dibenzoyloxy-4,4-dimethyl-2,5-androstadiene, 2α-cyano-3,17β-di(p-nitrobenzoyloxy)-4,4-dimethyl-2,5-androstadiene, 2α-cyano-3,17β-di(3,4,5-trimethoxybenzoyloxy)-4,4-dimethyl-2,5-androstadiene, 2α-cyano-3,17β-di(phenylacetoxy)-4,4-dimethyl-2,5-androstadiene, or 2α-cyano-3,17β-dicinnamoyloxy-4,4-dimethyl-2,5-androstadiene.

EXAMPLE 9

2α-cyano-17α-ethynylandrostan-17β-ol-3-one was prepared by treating 17β-hydroxy-17α-ethynylandrostano[2,3-d]isoxazole with sodium methoxide, and had the M.P. 264.2–270.4° C. (dec.) (corr.), $[\alpha]_D = -5.9°$ (1% in pyridine).

EXAMPLE 10

2α-cyano-17α-ethynyl-4-androsten-17β-ol-3-one was prepared by treating 17β-hydroxy-17α-ethynyl-4-androsteno[2,3-d]isoxazole with sodium methoxide, and had the M.P. 184.0–189.2° C. (corr.), $[\alpha]_D = +34.8°$ (1% in chloroform).

EXAMPLE 11

(a) 17β-(β-cyclohexylpropionoxy)-4,4,17α-trimethyl-5-androsteno[2,3-d]isoxazole was prepared by refluxing for seven hours a mixture of 17β-hydroxy-4,4,17α-trimethyl-5-androsteno[2,3-d]isoxazole and an excess of β-cyclohexylpropionic anhydride in pyridine. The product had the M.P. 121–124° C. (uncorr.).

(b) 2α-cyano-4,4,17α-trimethyl-17β-(β-cyclohexylpropionoxy)-5-androsten-3-one was prepared by treating 17β-(β-cyclohexylpropionoxy)-4,4,17α-trimethyl-5-androsteno[2,3-d]isoxazole with sodium methoxide, and had the M.P. 168–171° C. (uncorr.) when recrystallized from acetone.

EXAMPLE 12

(a) 17β-hydroxy-4,4-dimethyl-17α-ethynyl-5-androsteno[2,3-d]isoxazole was prepared from hydroxylamine and 2-hydroxymethylene-4,4-dimethyl-17α-ethynyl-4-androsten-17β-ol-3-one, and had the M.P. 211–221° C. (uncorr.) when recrystallized from ethanol; ultraviolet maximum at 229 mμ (ε=5,840).

(b) 2α-cyano-17α-ethynyl-4,4-dimethyl-5-androsten-17β-ol-3-one was prepared by treating 17β-hydroxy-4,4-dimethyl-17α-ethynyl-5-androsteno[2,3-d]isoxazole with sodium ethoxide, and had the M.P. 200–206° C. (uncorr.) when recrystallized from aqueous isopropyl alcohol; ultraviolet maximum at 238 mμ (ε=6,930); infrared absorption at 2.92, 3.04, 3.15, 3.41, 4.54, 5.79, 6.02, 6.12 and 6.83 μ.

EXAMPLE 13

2α-cyano-4,4-dimethyl-5-pregnene-3,20-dione was prepared by treating 20-oxo-4,4-dimethyl-5-pregneno[2,3-d]isoxazole with sodium ethoxide and had the M.P. 176–179° C. (uncorr.) when recrystallized from a benzene-ether mixture.

EXAMPLE 14

(a) 17-oxoandrostano[2,3-d]isoxazole, M.P. 171.0–173.8° (corr.) (recrystallized from ethyl acetate), $[\alpha]_D^{25} = +54.6°$ (1% in chloroform), was prepared by chromic acid oxidation of 17β-hydroxyandrostano[2,3-d]isoxazole.

(b) 2α-cyanoandrostane-3,17-dione was prepared by treating 17-oxoandrostano[2,3-d]isoxazole with sodium methoxide, and had the M.P. 206.4–218.8° C. (corr.) when recrystallized from tetrahydrofuran-ethyl acetate; $[\alpha]_D^{25} = +47.8°$ (1% in chloroform).

EXAMPLE 15

(a) 2-hydroxymethylene-4,4-diethyl-17α-methyl-5-androsten-17β-ol-3-one M.P. 177.2–178.2° C. (corr.) (recrystallized from ethyl acetate), $[\alpha]_D^{25} = -40.3°$ (1% in chloroform), was prepared by alkaline condensation of ethyl formate with 4,4-diethyl-17α-methyl-5-androsten-17β-ol-3-one, M.P. 186.0–189.8° C. (corr.) when recrystallized from methanol; $[\alpha]_D^{25} = -30.0°$ (1% in chloroform).

(b) 17β-hydroxy-4,4-diethyl-17α-methyl-5-androsteno[2,3-d]isoxazole, M.P. 138.2–168.0° C. (corr.) (recrystallized from methanol), $[\alpha]_D^{25} = -54.1°$ (1% in chloroform), was prepared by reacting 2-hydroxymethylene-4,4-diethyl-17α-methyl-5-androsten-17β-ol-3-one with hydroxylamine.

(c) 2α-cyano-4,4-diethyl-17α-methyl-5-androsten-17β-ol-3-one was prepared by treating 17β-hydroxy-4,4-diethyl-17α-methyl-5-androsteno[2,3-d]isoxazole with sodium methoxide, and was obtained in the form of colorless needles, M.P. 135.2–168.0° C. (corr.) when recrystallized from benzene; $[\alpha]_D^{25} = -33.8°$ (1% in chloroform). The wide melting point was due to polymorphism.

EXAMPLE 16

(a) 17β-acetoxy-4α,5α-epoxyandrostano[2,3-d]isoxazole, M.P. 228.6–229.8° C. (corr.) (recrystallized from a benzene-methanol mixture), $[\alpha]_D^{25} = +76.5°$ (1% in chloroform), was prepared by treating 17β-acetoxy-4-androsteno[2,3-d]isoxazole with maleic anhydride and hydrogen peroxide in methylene dichloride solution.

(b) 2α-cyano-4α,5α-epoxyandrostan-17β-ol-3-one was prepared by treating 17β-acetoxy-4α,5α-epoxyandrostano[2,3-d]isoxazole with sodium methoxide, and was obtained in the form of tan crystals, M.P. 257.8–270.0° C. (dec.)(corr.) when recrystallized from a pyridine-dioxane mixture, $[\alpha]_D^{25} = +137.4°$ (1% in pyridine).

It was also possible to isolate some of the product where the 17β-acetoxy group remained intact, that is, 2α-cyano-17β-acetoxy-4α,5α-epoxyandrostan-3-one, colorless needles, M.P. 194.8–198.0° C. (corr.) when recrystallized from a benzene-acetone mixture; $[\alpha]_D^{25} = +116.2°$ (1% in pyridine), −21.2° (1% in chloroform).

EXAMPLE 17

(a) 4α,5α-epoxy-17β-hydroxy-17α-ethynylandrostano[2,3-d]-isoxazole, M.P. 237.0–243.0° C. (dec.) (corr.) (recrystallized from dioxane-tetrahydrofuran-acetone), $[\alpha]_D^{25} = +32.0°$ (1% in chloroform), was prepared by treating 17β-hydroxy-17α-ethynyl-4-androstano[2,3-]isoxazole with maleic anhydride and hydrogen peroxide in methylene dichloride solution.

(b) 2α-cyano-4α,5α-epoxy-17α,ethynylandrostan-17β-ol-3-one was prepared by treating 4α,5α-epoxy-17β-hydroxy-17α-ethynylandrostano[2,3-d]isovazole with sodium methoxide, and was obtained in the form of rhomboids, M.P. 238.0–240.0° C. (dec.) (corr.) when recrystallized from methyl ethyl ketone; $[\alpha]_D^{25} = +59.0°$ (1á in pyridine).

EXAMPLE 18

(a) 4α,5α-epoxy-17β-hydroxy-17α-methylandrostano[2,3-d]isoxazole, M.P. 214.2–218.6° C. (corr.) (recrystallized from benzene), $[\alpha]_D^{25} = +80.7°$ (1% in chloroform), was prepared by treating 17β-hydroxy-17α-methyl- 4-androsteno[2,3-d]isoxazole with maleic anhydride and hydrogen peroxide in methylene dichloride solution.

(b) 2α - cyano-4α,5α-epoxy-17α-methylandrostan-17β-ol-3-one was prepared by treating 4α,5α-epoxy-17β-hydroxy-17α-methylandrostano[2,3-d]isoxazole with sodium methoxide, and had the M.P. 246.0–246.5° C. (dec.) (corr.) when recrystallized from a dioxane-benzene mixture; $[\alpha]_D^{25} = +122.9°$.

EXAMPLE 19

(a) 4α,5α - epoxy - 20β - hydroxypregnano[2,3-d]isoxazole, M.P. 191.4–193.4° C. (corr.) (recrystallized from methanol), $[\alpha]_D^{25} = +80.0°$ (1% in chloroform), was prepared by treating 20β-hydroxy-4-pregneno[2,3-d]isoxazole with maleic anhydride and hydrogen peroxide in methylene dichloride solution.

(b) 2α-cyano - 4α,5α - epoxypregnan-20β-ol-3-one was prepared by treating 4α,5α-epoxy-20β-hydroxypregnano[2,3-d]isoxazole with sodium methoxide, and had the M.P. 211.0°–215.6° C. (corr.) when recrystallized from a tetrahydrofuran-ethyl acetate mixture $[\alpha]_D^{25} = +99.0°$ (1% in chloroform), +124.1° (1% in pyridine).

EXAMPLE 20

2α-cyano-17β-acetoxy-5-androstene-3,4-dione was prepared by treating 17β-acetoxy-4-oxo-5-androsteno[2,3-d]isoxazole [M.P. 243.8–245.0° C. (corr.) when recrystallized from ethyl acetate; $[\alpha]_D^{25} = -29.0°$ (1% in chloroform)] with sodium methoxide, and was obtained in the form of light yellow rods, M.P. 216.2–220.2° C. (corr.) when recrystallized from benzene, $[\alpha]_D^{25} = +4.5°$ (1% in chloroform).

EXAMPLE 21

(a) 4α,5α - epoxy - 20 - oxopregnano[2,3-d]isoxazole, M.P. 208–210° C. (uncorr.) (recrystallized from a methylene dichloride-methyl ethyl ketone mixture), was prepared by treating 20-oxo-4-pregneno[2,3-d]isoxazole with maleic anhydride and hydrogen peroxide in methylene dichloride solution.

(b) 2α-cyano-4α,5α-epoxypregnane-3,20-dione was prepared by treating 4α,5α-epoxy-20-oxopregnano[2,3-d]isoxazole with sodium methoxide, and had the M.P. 220–223° C. (uncorr.) when recrystallized from a tetrahydrofuran-ethyl acetate mixture.

According to the foregoing specification the following 2-cyano-3-oxo steroids can be prepared by alkaline rearrangement of the corresponding steroido[2,3-d]isoxazoles:

| Example | Starting Material | Product |
| --- | --- | --- |
| 22 | 17β-hydroxy-17α-ethyl-4-androsteno[2,3-d]isoxazole. | 2α-cyano-17α-ethyl-4-androsten-17β-ol-3-one. |
| 23 | 17β-hydroxy-17α-vinyl-4-androsteno[2,3-d]isoxazole. | 2α-cyano-17α-vinyl-4-androsten-17β-ol-3-one. |
| 24 | 17β-hydroxy-17α-methyl-19-norandrostano[2,3-d]isoxazole. | 2α-cyano-17α-methyl-19-norandrostan-17β-ol-3-one. |
| 25 | 17β-hydroxy-17α-ethylandrostano[2,3-d]isoxazole. | 2α-cyano-17α-ethylandrostan-17β-ol-3-one. |
| 26 | 20-oxoallopregnano[2,3-d]isoxazole. | 2α-cyanoallopregnane-3,20-dione. |
| 27 | 20-oxopregnano[2,3-d]isoxazole. | 2β-cyanopregnane-3,20-dione. |
| 28 | 17β-hydroxy-4,6-androstadieno[2,3-d]isoxazole. | 2α-cyano-4,6-androstadien-17β-ol-3-one. |
| 29 | 17β-hydroxy-17α-methyl-4,6-androstadieno[2,3-d]isoxazole. | 2α-cyano-17α-methyl-4,6-androstadien-17β-ol-3-one. |
| 30 | 17β-hydroxy-17α-ethyl-4,6-androstadieno[2,3-d]isoxazole. | 2α-cyano-17α-ethyl-4,6-androstadien-17β-ol-3-one. |
| 31 | 17-oxo-4,6-androstadieno[2,3-d]isoxazole. | 2α-cyano-4,6-androstadiene-3,17-dione. |
| 32 | 20β-hydroxy-4-pregneno[2,3-d]isoxazole. | 2α-cyano-4-pregnen-20β-ol-3-one. |
| 33 | 4,4,17α-trimethyl-17β-hydroxyandrostano-[2,3-d]isoxazole. | 2α-cyano-4,4,17α-trimethyl-androstan-17β-ol-3-one. |
| 34 | 6α,17α-dimethyl-17β-hydroxy-4-androsteno[2,3-d]isoxazole. | 2α-cyano-6α,17α-dimethyl-4-androsten-17β-ol-3-one. |
| 35 | 17β-hydroxy-17α-propargyl-androstano[2,3-d]isoxazole. | 2α-cyano-17α-propargylandrostan-17β-ol-3-one. |
| 36 | 20,21-dihydroxy-4-pregneno-[2,3-d]isoxazole. | 2α-cyano-4-pregnene-20,21-diol-3-one. |
| 37 | 16α,17α,21-trihydroxy-20-oxo-9β,11β-oxido-4-pregneno[2,3-d]isoxazole ethylene glycol ketal. | 2α-cyano-9β,11β-oxido-4-pregnene-16α,17α,21-triol-3,20-dione 20-ethylene glycol ketal. |
| 38 | 17β-hydroxy-17α-propynyl-6-methyl-4-androsteno[2,3-d]isoxazole. | 2α-cyano-17α-propynyl-6-methyl-4-androsten-17β-ol-3-one. |
| 39 | 21-acetoxy-17α-hydroxy-11,20-dioxo-4,6-pregnadieno[2,3-d]isoxazole. | 2α-cyano-4,6-pregnadiene-17α,21-diol-3,11,20-trione. |
| 40 | 21-acetoxy-17α-hydroxy-11,20-dioxo-6-methyl-4-pregneno[2,3-d]isoxazole. | 2α-cyano-6-methyl-4-pregnene-17α,21-diol-3,11,20-trione. |
| 41 | 21-acetoxy-17α-hydroxy-11,20-dioxo-9-fluoro-6-methyl-4-pregneno[2,3-d]isoxazole. | 2α-cyano-9-fluoro-6-methyl-4-pregnene-17α,21-diol-3,11,20-trione. |
| 42 | 21-acetoxy-11β,16α,17α-trihydroxy-20-oxo-4-pregneno[2,3-d]isoxazole. | 2α-cyano-4-pregnene-11β,16α,17α,21-tetrol-3,20-dione. |
| 43 | 21-acetoxy-16α,17α-dihydroxy-11,20-dioxo-4-pregneno[2,3-d]isoxazole. | 2α-cyano-4-pregnene-16α,17α,21-triol-3,11,20-trione. |
| 44 | 11β,21-dihydroxy-4,17(20)-pregnadieno[2,3-d]isoxazole. | 2α-cyano-4,17(20)-pregnadiene-11β,21-diol-3-one. |
| 45 | 6β,17β-dihydroxyandrostano[2,3-d]isoxazole. | 2α-cyanoandrostane-6β,17β-diol-3-one. |
| 46 | 17α-ethynyl-17β-hydroxy-11-oxo-4-androsteno[2,3-d]isoxazole. | 2α-cyano-17α-ethynyl-4-androsten-17β-ol-3,11-dione. |
| 47 | 17α-methyl-17β-hydroxy-11-oxo-4-androsteno[2,3-d]isoxazole. | 2α-cyano-17α-methyl-4-androsten-17β-ol-3,11-dione. |
| 48 | 17β-hydroxy-11-oxo-4-androsteno[2,3-d]isoxazole. | 2α-cyano-4-androsten-17β-ol-3,11-dione. |
| 49 | 6β,17β-dihydroxy-4-androsteno[2,3-d]isoxazole. | 2α-cyano-4-androstene-6β,17β-diol-3-one. |
| 50 | 17α-methyl-6β,17β-dihydroxy-4-androsteno[2,3-d]isoxazole. | 2α-cyano-17α-methyl-4-androstene-6β,17β-diol-3-one. |
| 51 | 14α,17β-dihydroxy-4-androsteno[2,3-d]isoxazole. | 2α-cyano-4-androstene-14α,17β-diol-3-one. |
| 52 | 16β-methyl-17β-hydroxy-4-androsteno[2,3-d]isoxazole. | 2α-cyano-16β-methyl-4-androsten-17β-ol-3-one. |
| 53 | 11α,17β-dihydroxy-4-androsteno[2,3-d]isoxazole. | 2α-cyano-4-androstene-11α,17β-diol-3-one. |
| 54 | 6β,17β-dihydroxy-19-nor-4-androsteno[2,3-d]isoxazole. | 2α-cyano-19-nor-4-androstene-6β,17β-diol-3-one. |
| 55 | 4-methyl-17β-hydroxy-4-androsteno[2,3-d]isoxazole. | 2α-cyano-4-methyl-4-androsten-17β-ol-3-one. |
| 56 | 4,17α-dimethyl-17β-hydroxy-4-androsteno[2,3-d]isoxazole. | 2α-cyano-4,17α-dimethyl-4-androsten-17β-ol-3-one. |
| 57 | 17α-ethynyl-17β-hydroxy-4,6-androstadieno[2,3-d]isoxazole. | 2α-cyano-17α-ethynyl-4,6-androstadien-17β-ol-3-one. |
| 58 | 6β,17α,21-trihydroxy-20-oxo-allopregnano[2,3-d]isoxazole. | 2α-cyanoallopregnane-6β,17α,21-triol-3,20-dione. |
| 59 | 21-acetoxy-12α,17α-dihydroxy-20-oxo-4-pregneno[2,3-d]isoxazole. | 2α-cyano-4-pregnene-12α,17α,21-triol-3,20-dione. |
| 60 | 21-acetoxy-17α-hydroxy-12,20-dioxoallopregnano-[2,3-d]isoxazole. | 2α-cyanoallopregnane-17α,21-diol-3,12,20-trione. |
| 61 | 20-oxo-4,11-pregnadieno-[2,3-d]isoxazole. | 2α-cyano-4,11-pregnadiene-3,20-dione. |
| 62 | 17α-methyl-20-oxo-4-pregneno[2,3-d]isoxazole. | 2α-cyano-17α-methyl-4-pregnene-3,20-dione. |
| 63 | 6β-hydroxy-20-oxo-4-pregneno[2,3-d]isoxazole. | 2α-cyano-4-pregnen-6β-ol-3,20-dione. |
| 64 | 7β,11β-dihydroxy-20-oxo-4-pregneno[2,3-d]isoxazole. | 2α-cyano-4-pregnene-7β,11β-diol-3,20-dione. |
| 65 | 12α-chloro-17α,21-dihydroxy-11,20-dioxo-4-pregneno[2,3-d]isoxazole. | 2α-cyano-12α-chloro-4-pregnene-17α,21-diol-3,11,20-trione. |
| 66 | 20-oxo-18,19-bisnor-4-pregneno[2,3-d]isoxazole. | 2α-cyano-18,19-bisnor-4-pregnene-3,20-dione. |
| 67 | 7α,12α-dihydroxy-20-oxo-4-pregneno[2,3-d]isoxazole. | 2α-cyano-4-pregnene-7α,12α-diol-3,20-dione. |
| 68 | 7,20-dioxoallopregnano-[2,3-d]isoxazole. | 2α-cyanoallopregnane-3,7,20-trione. |
| 69 | 6α,17α-dimethyl-17β-hydroxyandrostano[2,3-d]isoxazole. | 2α-cyano-6α,17α-dimethyl-androstan-17β-ol-3-one. |
| 70 | 17β-hydroxy-17α-propyl-4-androsteno[2,3-d]isoxazole. | 2α-cyano-17α-propyl-4-androsten-17β-ol-3-one. |
| 71 | 17α-allyl-17β-hydroxy-4-androsteno[2,3-d]isoxazole. | 2α-cyano-17α-allyl-4-androsten-17β-ol-3-one. |
| 72 | 17β-hydroxy-17α-propargyl-4-androsteno[2,3-d]isoxazole. | 2α-cyano-17α-propargyl-4-androsten-17β-ol-3-one. |
| 73 | 4,4,17,17-tetramethyl-18-nor-5,13-androstadieno-[2,3-d]isoxazole. | 2α-cyano-4,4,17,17-tetramethyl-18-nor-5,13-androstadien-3-one. |
| 74 | 17β-hydroxy-17α-propynyl-4-androsteno[2,3-d]isoxazole. | 2α-cyano-17α-propynyl-4-androsten-17β-ol-3-one. |

| Example | Starting Material | Product |
|---------|-------------------|---------|
| 75 | 17β-hydroxy-17α-propynyl-androsteno[2,3-d]isoxazole. | 2α-cyano-17α-propynylandrosten-17β-ol-3-one. |
| 76 | 17β-hydroxy-17α-methyl-19-nor-4-androsteno[2,3-d]isoxazole. | 2α-cyano-17α-methyl-19-nor-4-androsten-17β-ol-3-one. |
| 77 | 17β-hydroxy-17α-propynyl-androstano[2,3-d]isoxazole. | 2α-cyano-17α-propynyl-androstan-17β-ol-3-one. |
| 78 | 6α-fluoro-20-oxo-4-pregneno-[2,3-d]isoxazole. | 2α-cyano-6α-fluoro-4-pregnene-3,20-dione. |
| 79 | 6-fluoro-20-oxo-4,6-pregnadieno[2,3-d]isoxazole. | 2α-cyano-6-fluoro-4,6-pregnadiene-3,20-dione. |
| 80 | 17α-methyl-17β-hydroxy-19-nor-4,9-androstadieno-[2,3-d]isoxazole. | 2α-cyano-17α-methyl-19-nor-4,9-androstadien-17β-ol-3-one. |
| 81 | 7β,17α-dimethyl-17β-hydroxy-4-androsteno[2,3-d]isoxazole. | 2α-cyano-7β,17α-dimethyl-4-androsten-17β-ol-3-one. |
| 82 | 5-methyl-11β,17α,21-trihydroxy-20-oxopregnano-[2,3-d]isoxazole. | 2β-cyano-5-methylpregnane-11β,17α,21-triol-3,20-dione. |

We claim:
1. A 2-cyano-3-oxo-steroid, the steroid moiety having from seventeen to about twenty-three carbon atoms exclusive of ester radicals and being selected from the group consisting of the estrane, 18-norestrane, androstane, etiocholane, pregnane and allopregnane series.
2. A compound according to claim 1 wherein the steroid moiety possesses two lower-alkyl groups in the 4-position and a double bond in the 5,6-position.
3. 2α-cyano-17α-methyl-4-androsten-17β-ol-3-one.
4. 2α-cyano-17α-methylandrostan-17β-ol-3-one.
5. 2β-cyano-17α-methyletiocholan-17β-ol-3-one.
6. 2α-cyanoandrostan-17β-ol-3-one.
7. 2α-cyano-4,4,17α-trimethyl-5-androsten - 17β - ol-3-one.
8. 2α-cyanoandrostane-3,17-dione.
9. 2α-cyano-4,4-diethyl-17α-methyl-5 - androsten - 17β-ol-3 one.
10. 2α-cyano-4α,5α-epoxyandrostan-17β-ol-3-one.
11. 2α-cyano-4α,5α-epoxy-17α-ethynylandrostan - 17β-ol-3-one.
12. 2α-cyano-4α,5α-epoxy-17α-methylandrostan - 17β-ol-3-one.
13. 2α-cyano-4α,5α-epoxypregnan-20β-ol-3-one.
14. 2α-cyano-17β-acetoxy-5-androstene-3,4-dione.
15. 2α-cyano-4α,5α-epoxypregnane-3,20-dione.
16. A 3-enol ester of a compound of claim 1, said ester having a carboxylic acyl radical of from one to ten carbon atoms.
17. 2α - cyano- 4,4 - di-lower-alkyl-17α-R-4-androsten-17β-ol wherein R is hydrogen, lower-alkyl or lower-alkynyl; or a 17-ester thereof, said ester having a carboxylic acyl radical of from one to ten carbon atoms.
18. 2-cyano-3-(β-cyclohexylpropionoxy) - 4,4,17α-trimethyl-2,5-androstadien-17β-ol.
19. 2α-cyano-4,4-dimethylandrostan-17β-ol-3-one.
20. 2α-cyano-4,4-dimethyl-5-androsten-17β-ol-3-one.
21. 2α-cyano-17α-ethynylandrostan-17β-ol-3-one.
22. 2α-cyano-17α-ethynyl-4-androsten-17β-ol-3-one.

References Cited by the Examiner
UNITED STATES PATENTS 3,035,051  5/1962  Kissman et al. _____ 260—239.55
3,198,790  8/1965  Ruggieri et al. _____ 260—239.5

OTHER REFERENCES

Auwers et al.: Ann., 441, pages 54 to 100 (1925), pages 54, 55, 68, 81 and 83.
Johnson et al.: J. Amer. Chem. Soc., 67, pp. 1745–1754 (1945), pages 1745, 1746, and 1750 relied on.
Ruggieri et al.: (II), Gaz. Chim. It., 92, pp. 768–798 (1962) pages 771–774 relied on.
Winternitz et al.: Bull. Soc. Chim., pp. 505–508 (1960).

LEWIS GOTTS, *Primary Examiner.*

THOMAS M. MESHBESHER, *Assistant Examiner.*

UNITED STATES PATENT AND TRADEMARK OFFICE
CERTIFICATE OF CORRECTION

PATENT NO. : 3,296,255
DATED : January 3, 1967
INVENTOR(S) : Raymond O. Clinton and Andrew John Manson It is certified that error appears in the above-identified patent and that said Letters Patent are hereby corrected as shown below:

Column 1, line 14, "June 23, 1958," should read --July 23, 1958,--; line 53, "1,2-dihydroxyetheyl," should read --1,2-dihydroxyethyl,--.

Column 2, line 65, "clevage" should read --cleavage--.

Column 3, line 74, "soduim" should read --sodium--.

Column 4, line 32, "soduim" should read --sodium--.

Column 5, line 67, "rates" should read --rats--.

Column 6, line 54, "...[2,4-d]" should read --...[2,3-d]-- line 62, "-4-4-" should read -- -4,4- --.

Column 7, line 56, "ethanol" should read --methanol--; line 75, "173.8°" should read --173.8°C.--.

Column 8, line 27, "-17a-methyl-" should read -- -17α-methyl- --; line 60, "-androstano[2,3-]isox-" should read -- -androsteno[2,3-d]isox- --; line 63, "-17α," should read -- -17α- --; line 65, "isovazole" should read --isoxazole- line 68, "1á" should read --1%--.

Column 9, line 21, "mixture" should read --mixture,--.

Column 11, line 37, Claim 9, "ol-3 one" should read --ol-3-one--.

UNITED STATES PATENT AND TRADEMARK OFFICE
CERTIFICATE OF CORRECTION

PATENT NO. : 3,296,255
DATED : January 3, 1967
INVENTOR(S) : Raymond O. Clinton and Andrew John Manson It is certified that error appears in the above-identified patent and that said Letters Patent are hereby corrected as shown below:

Column 12, lines 11 and 12, Claim 17, "4-androsten-17β-ol" should read -- 5-androsten-17β-ol-3-one --.

Signed and Sealed this

Seventh Day of December 1976

[SEAL]

Attest:

RUTH C. MASON
*Attesting Officer*

C. MARSHALL DANN
*Commissioner of Patents and Trademarks*